United States Patent
Lloyd

(10) Patent No.: US 7,946,599 B2
(45) Date of Patent: May 24, 2011

(54) CROSS-LINKED VARIABLE PISTON AIR SUSPENSION

(75) Inventor: Jeffrey M. Lloyd, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 183 days.

(21) Appl. No.: 12/402,100

(22) Filed: Mar. 11, 2009

(65) Prior Publication Data
US 2010/0230912 A1    Sep. 16, 2010

(51) Int. Cl.
*B60G 17/052*    (2006.01)
(52) U.S. Cl. ....... 280/124.106; 280/5.514; 280/124.157; 280/124.16; 267/64.27
(58) Field of Classification Search ............... 267/64.11, 267/64.21, 64.27, 64.23, 64.24; 280/124.157, 280/124.161, 124.16, 124.106, 5.502, 5.514, 280/5.519
See application file for complete search history.

(56) References Cited

U.S. PATENT DOCUMENTS

| | | | | |
|---|---|---|---|---|
| 3,090,611 | A | * | 5/1963 | Schultze ...................... 267/186 |
| 3,328,019 | A | * | 6/1967 | Wilson ......................... 267/186 |
| 3,736,000 | A | * | 5/1973 | Capgras ..................... 267/64.16 |
| 3,779,535 | A | * | 12/1973 | Strand ........................ 267/64.15 |
| 3,871,635 | A | * | 3/1975 | Unruh et al. ................. 267/187 |
| 3,980,316 | A | | 9/1976 | Yates |
| 4,606,551 | A | * | 8/1986 | Toti et al. ................ 280/124.161 |
| 5,087,073 | A | * | 2/1992 | Lund ........................... 188/266.2 |
| 5,794,966 | A | * | 8/1998 | MacLeod .................... 280/5.507 |
| 5,899,472 | A | * | 5/1999 | Burke et al. ........... 280/124.106 |
| 6,517,094 | B1 | * | 2/2003 | Kincaid et al. ......... 280/124.106 |
| 6,834,865 | B1 | * | 12/2004 | Lin ............................. 280/5.507 |
| 7,156,382 | B2 | * | 1/2007 | Lloyd ........................ 267/64.28 |
| 7,240,906 | B2 | * | 7/2007 | Klees .......................... 280/5.502 |
| 7,472,914 | B2 | * | 1/2009 | Anderson et al. ........... 280/5.519 |
| 7,751,959 | B2 | * | 7/2010 | Boon et al. ....................... 701/38 |
| 2005/0173851 | A1 | | 8/2005 | Lloyd |
| 2006/0091635 | A1 | * | 5/2006 | Cook ..................... 280/124.106 |

FOREIGN PATENT DOCUMENTS

| | | |
|---|---|---|
| DE | 3233160 A1 | 3/1984 |
| DE | 3247391 A * | 6/1984 |
| DE | 3934821 A1 | 4/1991 |
| GB | 2440023 A | 1/2008 |

OTHER PUBLICATIONS

European Search Report dated Jun. 9, 2010.

* cited by examiner

*Primary Examiner* — Ruth Ilan
(74) *Attorney, Agent, or Firm* — Carlson, Gaskey & Olds

(57) ABSTRACT

An air suspension includes first and second air spring assemblies that each include a piston airbag and a primary airbag. A first fluid connection connects one of a first piston airbag and a first primary airbag of the first air spring assembly to one of a second piston airbag and a second primary airbag of the second air spring assembly. A second fluid connection connects the other of the first piston airbag and the first primary airbag to the other of the second piston airbag and the second primary airbag. Air flow through the first and second fluid connections is passively controlled solely in response to road load inputs to reduce roll stiffness and improve articulation.

19 Claims, 3 Drawing Sheets

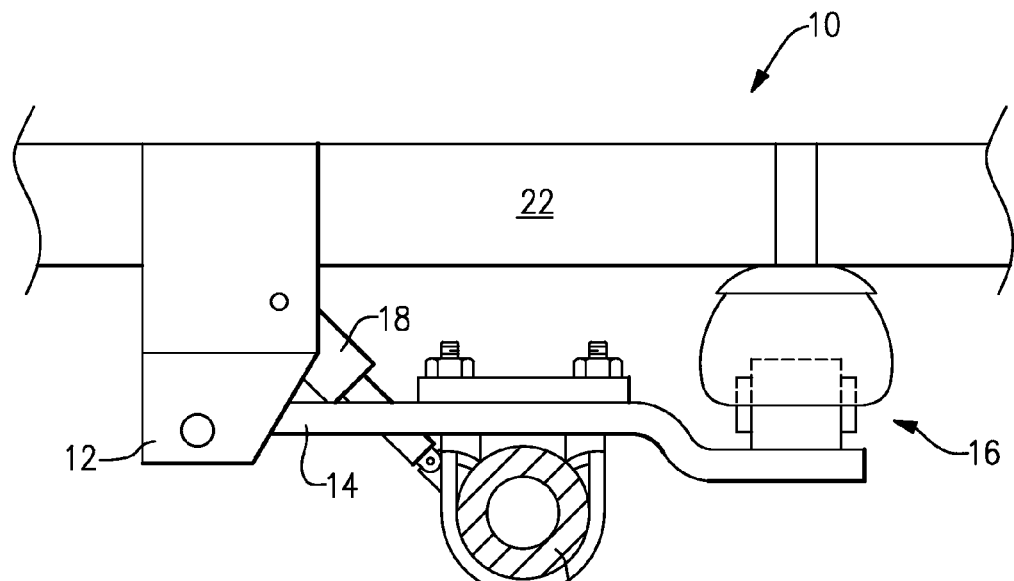
FIG.1
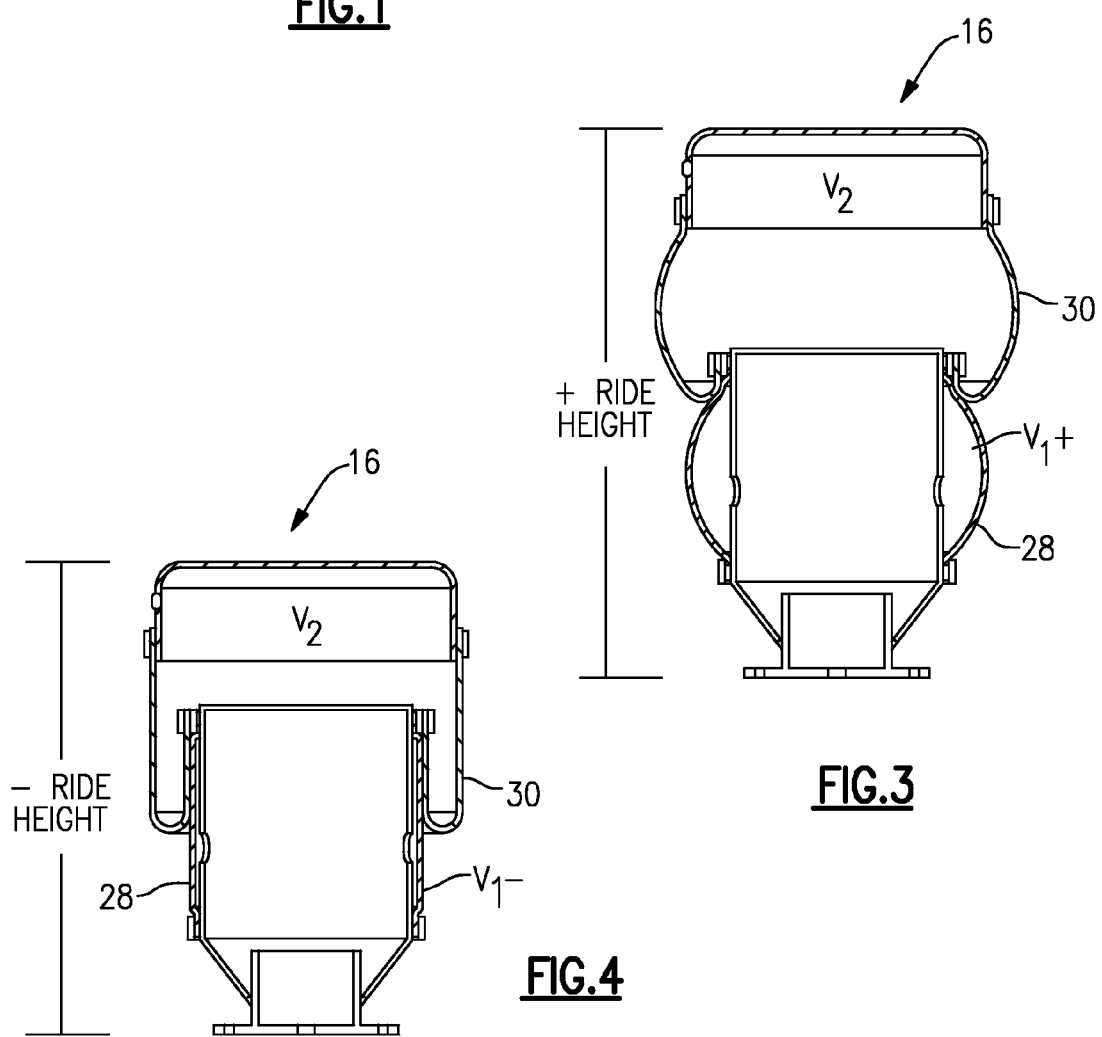
FIG.3
FIG.4

US 7,946,599 B2

CROSS-LINKED VARIABLE PISTON AIR SUSPENSION

TECHNICAL FIELD

This invention generally relates to an air suspension system with cross-linked air spring assemblies.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates without requiring any auxiliary tanks and associated actuators. The smaller volume of the piston airbag relative to the larger volume of the primary airbag permits rapid pressure and volume changes to enable active suspension control.

This adjustable piston configuration also changes the load of the air spring assembly via the adjustment in effective piston area. When a vehicle is driving off-road or is subjected to poor road conditions, roll stiffness should be minimized to improve articulation. With a traditional air spring assembly having a single bag configuration, roll stiffness could be minimized by cross-linking the air springs; however, large diameter hoses are needed to move the large air volume between the air springs. This is disadvantageous from a packaging and cost perspective.

SUMMARY OF THE INVENTION

A first air spring assembly is fluidly cross-linked via a passive control to a second air spring assembly. Air flow between the first and second air spring assemblies through this cross-link is solely controlled via road load inputs. This provides reduced roll stiffness and greater articulation, as well as improving traction.

In one example, the first air spring assembly includes a first piston airbag and a first primary airbag mounted around the first piston airbag such that the first piston airbag provides a rolling surface for the first primary airbag. The second air spring assembly includes a second piston airbag and a second primary airbag mounted around the second piston airbag such that the second piston airbag provides a rolling surface for the second primary airbag. A first fluid connection connects one of the airbags of the first air spring assembly to one of the airbags of the second air spring assembly. A second fluid connection connects the other of the airbags of the first air spring to the other of the airbags of the second air spring assembly.

In one example, the first piston airbag is connected to the second primary airbag with the first fluid connection, and the second piston airbag is connected to the first primary airbag with the second fluid connection. The first and second air spring assemblies are associated with respective first and second wheels. When the first wheel experiences a road load input, the first piston airbag is compressed, which causes air to be communicated to the second primary airbag via the first fluid connection. This provides for greater articulation at the first wheel and improved traction at the second wheel. The reverse flow occurs in a similar manner with a road load input at the second wheel causing air to flow from the compressed second piston airbag to inflate the first primary airbag via the second fluid connection.

In one example, the air suspension includes an active control that independently controls air supply to and from the first piston airbag, the first primary airbag, the second piston airbag, and the second primary airbag. This active control is also independent of the passive control of air flow through the first and second fluid connections. In one example, passive control of air flow through the first and second fluid connections only occurs when the active control is off.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is sectional view of the air spring in a second position.

DETAILED DESCRIPTION OF THE PREFERRED EMBODIMENT

Figure 2:
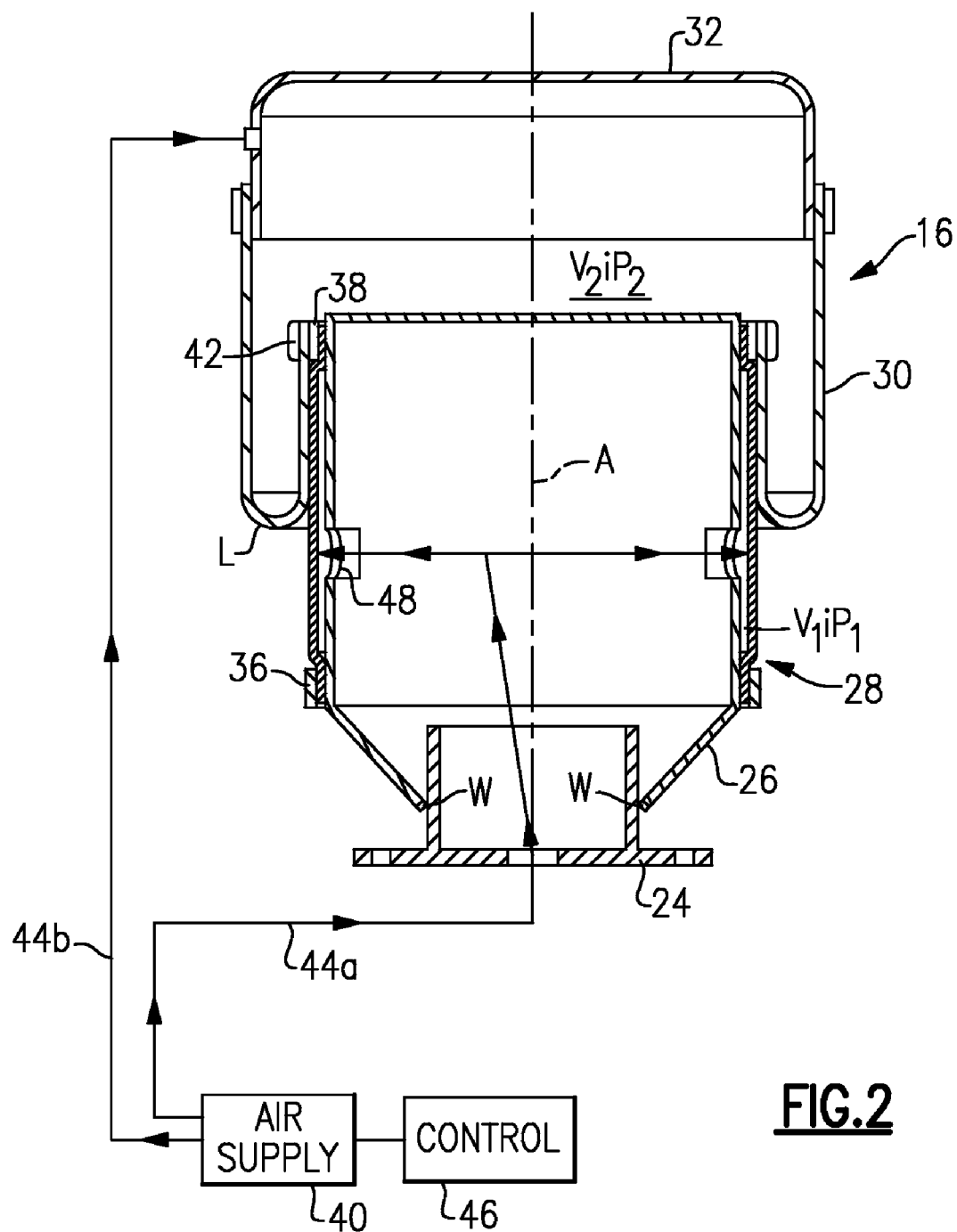
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle assembly 20.

Referring to FIG. 2, the air spring assembly 16 is illustrated in cross-section. The air spring assembly 16 is defined along a central vertical axis A and includes a lower mount 24 (illustrated schematically), a piston support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston airbag 28 through a third band 42 which is spaced radially outwardly relative to the second band 38 with the primary airbag 30 being located between the second 38 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first and second supply conduits 44a, 44b respectively in response to a controller 46 (illustrated schematically). The controller 46 is a suspension controller that provides active suspension control methodology. Ports 48 through the piston structure 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

As discussed above, this adjustable piston configuration changes the load of the air spring assembly via the adjustment in effective piston area. When a vehicle is driving off-road or is subjected to poor road conditions, roll stiffness should be minimized to improve articulation and traction. This is accomplished by cross-linking air spring assemblies in a passive control configuration as shown schematically in FIG. 5.

Figure 5:
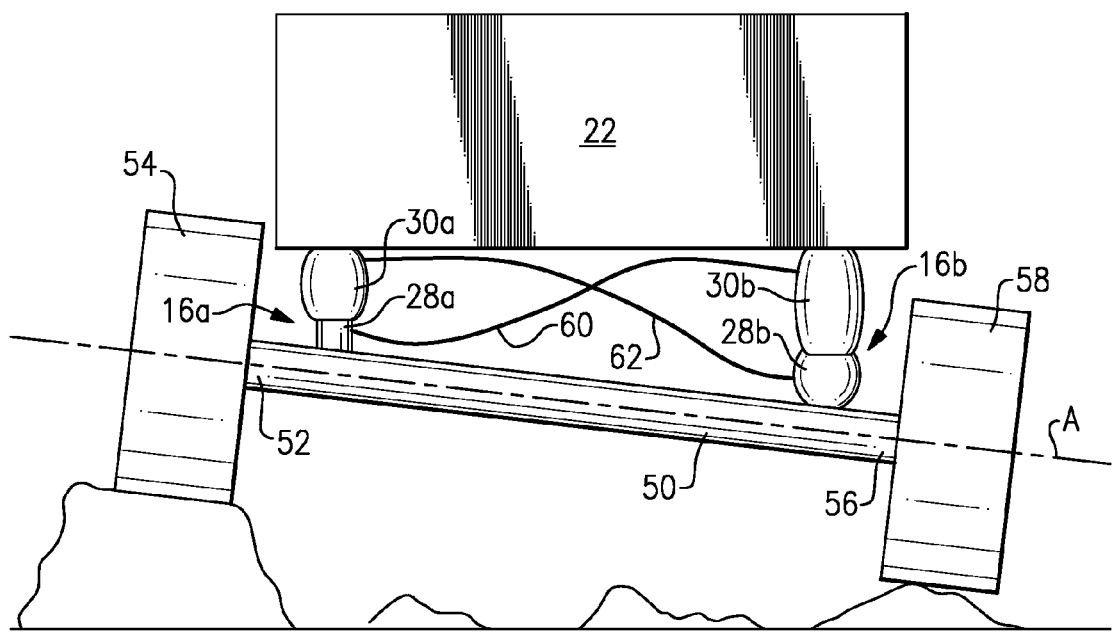
FIG. 5 is a schematic view of a passive cross-link control between airbag assemblies associated with a pair of laterally spaced wheels.

In the example of FIG. 5, an axle beam 50 includes a first end 52 that supports a first wheel 54 and a second end 56 that supports a second wheel 58 for rotation about an axis A. A first air spring assembly 16a is associated with the first wheel 54 and a second air spring assembly 16b is associated with the second wheel 58. It should be understood that while the air spring assemblies 16a, 16b are shown as being supported between the frame or chassis 22 and the axle beam 50, the air spring assemblies 16a, 16b could be positioned on a suspension arm or longitudinal member 14 as shown in FIG. 1.

The first air spring assembly 16a includes a first piston airbag 28a and a first primary airbag 30a mounted around the first piston airbag 28a in the manner described above. Similarly, the second air spring assembly 16b includes a second piston airbag 28b and a second primary airbag 30b. The air spring assemblies 16a, 16b are actively controlled in the manner described above.

The first piston airbag 28a is fluidly connected to the second primary airbag 30b with a first fluid connection 60 and the second piston airbag 28b is connected to the first primary airbag 30a with a second fluid connection 62. In one example, the first 60 and second 62 fluid connections comprise flexible hose members; however, other types of connections could also be used. Further, it should be understood that each fluid connection member is connected to the associated component of the air spring assemblies with appropriate sealed fittings.

When driving in rough, off-road conditions, the first 54 and second 58 wheels are subjected to significant/severe road load inputs caused by rocks, holes, etc. When the first wheel 54 experiences a significant road load input L, caused by traveling over a rock R as shown in FIG. 5, the first piston airbag 28a compresses, automatically causing air to be communicated to inflate the second primary airbag 30b. Due to the inclusion of the first fluid connection 60, the first piston airbag 28a is able to compress by a significant amount reducing spring load/rate to further improve articulation. Also, as the second primary airbag 30b inflates spring load/rate is increased resulting in improved traction at the second wheel 58. Transfer from the second piston airbag 28b to the first primary airbag 30a occurs in the same manner. Further, if the air suspension includes a four wheel configuration with an additional pair of air spring assemblies being associated with a second axle, the additional pair of air spring assemblies could be cross-linked to each other in the same manner as described above.

Thus, air flow back and forth through the first 60 and second 62 fluid connections is solely controlled by road load inputs, i.e. air flow is passively controlled within the air suspension system. Alternatively, the fluid connections 60, 62 could be switched on and off as desired with valves through a switch or the controller 46 to adjust the roll stiffness as desired.

As discussed above, the air spring assemblies can also be part of an actively controlled system that operates independently of the air flow through the first 60 and second 62 fluid connection members. In one example, the air flow within the first 60 and second 62 fluid connection members only occurs when the active system is off. However, the cross-linked air springs shown in FIG. 5 could also be used as part of a simplified air spring assembly configuration that only includes passive control as described above. Further, while the cross-link is shown as linking one piston airbag to an opposite primary airbag, other configurations could also be utilized such as opposing piston airbags and/or opposing primary airbags being fluidly connected to each other.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air suspension system comprising:
a first air spring assembly including a first piston airbag and a first primary airbag mounted around said first piston airbag such that said first piston airbag provides a rolling surface for said first primary airbag;
a second air spring assembly including a second piston airbag and a second primary airbag mounted around said second piston airbag such that said second piston airbag provides a rolling surface for said second primary airbag;
a first fluid connection connecting one of said first piston airbag and said first primary airbag of said first air spring assembly to one of said second piston airbag and said second primary airbag of said second air spring assembly; and
a second fluid connection connecting the other of said first piston airbag and said first primary airbag of said first air spring to the other of said second piston airbag and said second primary air bag of said second air spring assembly.

2. The air suspension system according to claim 1 wherein said first fluid connection connects said first piston airbag to said second primary airbag and said second fluid connection connects said first primary airbag to said second piston airbag.

3. The air suspension system according to claim 2 wherein said first air spring assembly is to be associated with a first wheel and said second air spring assembly is to be associated with a second wheel laterally spaced from the first wheel, and wherein in response to a road load input at the first wheel, compression of said first air spring assembly automatically causes air to flow from said first piston airbag through said first fluid connection to inflate said second primary airbag.

4. The air suspension system according to claim 3 wherein in response to another road load input at the second wheel, compression of said second air spring assembly automatically causes air to flow from said second piston airbag through said second fluid connection to inflate said first primary airbag.

5. The air suspension system according to claim 3 including an axle member having a first end coupled to the first wheel and a second end coupled to the second wheel.

6. The air suspension system according to claim 1 wherein said first and said second fluid connections cooperate to comprise a passive cross-link control wherein air flow through said first and said second fluid connections is solely controlled by road load inputs.

7. The air suspension system according to claim 6 including a controller that actively controls air supply to and from said first piston airbag, said first primary airbag, said second piston airbag, and said second primary airbag independently of air flow through said passive cross-link control.

8. The air suspension system according to claim 1 wherein said first and said second fluid connections comprise flexible hoses.

9. The air suspension system according to claim 1 wherein the first primary airbag defines a first variable volume and the first piston airbag defines a second variable volume that is always less than the first variable volume, and wherein the second primary airbag defines a third variable volume and the second piston airbag defines a fourth variable volume that is always less than the third variable volume, and
wherein said first piston airbag is mounted to a first piston, and one end of said first primary airbag is mounted to said first piston and said first piston airbag and an opposite end of said first primary airbag is mounted to an upper vehicle mount such that said first piston airbag is vertically below said first primary airbag and operates as a roll-off piston surface for said first primary airbag, and
wherein said second piston airbag is mounted to a second piston, and one end of said second primary airbag is mounted to said second piston and said second piston airbag and an opposite end of said second primary airbag is mounted to an upper vehicle mount such that said second piston airbag is vertically below said second primary airbag and operates as a roll-off piston surface for said second primary airbag, and
wherein said first piston airbag is fluidly connected to said second primary airbag and said second piston airbag is fluidly connected to said first primary airbag.

10. The air suspension system according to claim 1 including an active control system with a controller that actively controls air supply into said primary and piston airbags to continuously adjust ride height and spring rate of said first and second air spring assemblies independent of solely passive control of air flow through said first and second fluid connections.

11. The air suspension system according to claim 10 where passive control of air flow through said first and second fluid connections only occurs when said active control system is off.

12. A method of controlling roll stiffness in an air suspension comprising the steps of:
(a) fluidly connecting one of a first piston airbag and a first primary airbag of a first air spring assembly to one of a second piston airbag and a second primary airbag of a second air spring assembly with a first fluid connection;
(b) fluidly connecting the other of the first piston airbag and the first primary airbag of the first air spring assembly to the other of the second piston airbag and the second primary air bag of the second air spring assembly with a second fluid connection; and
(c) passively controlling air flow through the first and second fluid connection solely in response to road load inputs.

13. The method according to claim 12 wherein step (a) including fluidly connecting the first piston airbag to the second primary airbag with the first fluid connection and wherein step (b) includes fluidly connecting the second piston airbag to the first primary airbag with the second fluid connection.

14. The method according to claim 13 including fluidly connecting an air supply system to the first air spring assembly and the second air spring assembly and actively controlling air supply to the first and second air spring assemblies independent of the first and second fluid connections.

15. The method according to claim 14 including providing a controller to actively supply air to and from the first piston airbag, the first primary airbag, the second piston airbag, and the second primary airbag.

16. The method according to claim 14 wherein step (c) only occurs when active control is off.

17. The method according to claim 12 including mounting the first primary airbag around the first piston airbag such that the first piston airbag provides a rolling surface for the first primary airbag, and mounting the second primary airbag around the second piston airbag such that the second piston airbag provides a rolling surface for the second primary airbag.

18. The method according to claim 12 wherein the first primary airbag defines a first variable volume and the first piston airbag defines a second variable volume that is always less than the first variable volume, and wherein the second primary airbag defines a third variable volume and the second piston airbag defines a fourth variable volume that is always less than the third variable volume, and including mounting the first piston airbag to a first piston, mounting one end of the first primary airbag to the first piston and piston airbag and an opposite end of the first primary airbag to an upper vehicle mount such that the first piston airbag is vertically below the first primary airbag and operates as a roll-off piston surface for the first primary airbag, mounting the second piston airbag to a second piston, mounting one end of the second primary airbag to the second piston and second piston airbag and an opposite end of the second primary airbag to an upper vehicle mount such that the second piston airbag is vertically below the second primary airbag and operates as a roll-off piston surface for the second primary airbag, and step (b) includes fluidly connecting the first piston airbag to the second primary airbag and fluidly connecting the second piston airbag to the first primary airbag.

19. The method according to claim 12 including actively controlling air supply into the primary and piston airbags to continuously adjust ride height and spring rate independent of the solely passive control of air flow through the first and second fluid connections.

\* \* \* \* \*